United States Patent [19]

Tancrede et al.

[11] Patent Number: 4,497,936

[45] Date of Patent: Feb. 5, 1985

[54] ELASTOMER-ETHYLENE COPOLYMER HOT MELT SYSTEMS

[75] Inventors: Jean M. Tancrede, Baton Rouge, La.; Anthony J. Berejka, Huntington, N.Y.

[73] Assignee: Exxon Research & Engineering Co., Florham Park, N.J.

[21] Appl. No.: 483,492

[22] Filed: Apr. 11, 1983

[51] Int. Cl.³ ...................... C08L 33/06; C08L 45/00
[52] U.S. Cl. ..................................... 525/222; 525/211
[58] Field of Search ....................... 525/222, 210, 211

[56] References Cited

U.S. PATENT DOCUMENTS 4,332,655 6/1982 Berejka ........................... 204/159.2

OTHER PUBLICATIONS

U.S. application 429,481, filed Sep. 30, 1982, J. Lechat et al.

Primary Examiner—Jacob Ziegler
Attorney, Agent, or Firm—Roland A. Dexter

[57] ABSTRACT

Hot melt compositions comprising a mixture of an adhesive ethylene-vinyl acetate copolymer having a melt index of 700 to 10000 and containing from 9 to 40% vinyl acetate in combination with an olefin rubber exhibit excellent adhesive properties. The resulting blends have good elevated temperature resistance; outstanding low temperature flexibility, excellent adhesion to a wide variety of surfaces and markedly reduced melt viscosities at the application temperature.

6 Claims, No Drawings

4,497,936

ELASTOMER-ETHYLENE COPOLYMER HOT MELT SYSTEMS

This invention relates to adhesive compositions. More particularly, this invention relates to adhesive compositions comprising a mixture of an adhesive ethylene-vinyl acetate copolymer and an elastomeric olefin polymer.

BACKGROUND OF THE INVENTION

Copolymers of ethylene and a monoolefinically unsaturated polar comonomer such as vinyl acetate, methyl methacrylate, acrylic acid, and the like have been widely employed for their adhesive properties particularly for the reason that they form firm bonds to nonporous substrates such as metals or glass.

Even though the aforementioned copolymers exhibit superior qualities as adhesives their application is limited by two significant shortcomings. In damp or humid environments or in applications where the adhesive can otherwise be contacted by water, the adhesive bond fails. Furthermore, in those environments where arctic or subarctic conditions are encountered, for example, below about $-40°$ F., the adhesives become inflexible and fracture under dynamic conditions.

The above significant shortcomings are said to be overcome by compositions comprising a blend of an adhesive copolymer of ethylene and a monoolefinically unsaturated polar comonomer, for example, vinyl acetate, in combination with an olefin rubber, preferably a rubbery copolymer of ethylene and propylene, exhibit excellent adhesive properties, particularly when applied to non-porous surfaces such as metals as taught in U.S. Pat. No. 4,332,655. Unfortunately these blends of olefin rubber and the ethylene copolymers (all of which possess melt indexes of less than 500 dg/min.) result in adhesive formulations having very high melt viscosities and thus are very difficult to apply, particularly to heat sensitive materials like polyethylene.

Further, the diluents such as waxes and plasticizers, which are added to reduce the undesirably high melt viscosity and thus make the adhesive mass more flowable, have no inherent strength and generally adversely affect adhesive performance.

It is an object of this invention to provide an eastomer-ethylene copolymer blend of reduced melt viscosity which blend retains its useful adhesive properties.

SUMMARY OF THE INVENTION

It has been discovered that a blend of 70 parts by weight of an ethylene vinyl acetate copolymer and 30 parts by weight of an ethylene-propylene copolymer having a Mooney viscosity of about 43 at 100° C. has a surprisingly low and useful melt viscosity when the ethylene-vinyl acetate copolymer having a 25 weight percent content of vinyl acetate and a melt index of 150 of the blend is replaced by an ethylene-vinyl acetate copolymer having a 14 weight percent content of vinyl acetate and a melt index of 2500.

Thus in accordance with this invention, there is provided an adhesive composition comprising (a) an ethylene-vinyl acetate copolymer having a vinyl acetate content of from 9 to 40, preferably 10 to 20, optimally about 14, percent by weight and a melt index of from 700 to 10,000, preferably from 1,500 to 3,500, optimally about 2,500, and (b) an olefin elastomer which has a Mooney viscosity at 250° F. of less than about 70, preferably about 45 or less, optimally from 20 to 25 and is present in amount of from 15 to 60, preferably 20 to 40, parts by weight per 100 parts by weight of the elastomer and the normally adhesive copolymer together.

The olefin elastomers are preferably of the class of ethylene copolymers and terpolymers and butyl rubbers.

The adhesives of the invention are characterized by melt viscosities of less than about 55,000 cps at 350° F. which makes possible application to heat sensitive materials without thermal degradation of the substrate with retention of adhesive strength at ambient temperatures.

DETAILED DESCRIPTION OF THE INVENTION

The adhesive formulations of the invention broadly comprise an adhesive copolymer of ethylene and vinyl acetate and an olefin rubber as the elastomeric component.

The ethylene vinyl acetate copolymers having a 9 to 40 percent by weight content of vinyl acetate and a melt index of from 700 to 10,000 are known and the subject matter of copending U.S. patent application Ser. No. 429,481 (of common assignee) wherein both the copolymer class and its method of preparation are disclosed and fully incorporated herein by reference thereto.

The olefin rubbers are produced from the polymerization of olefins and usefully have a Mooney viscosity (ML 4 at 250° F.) that vary over the range from about 20–70 with those providing the best results in adhesive blends having a viscosity varying over the range of about 20 to 45 and preferably 20 to 25.

Elastomeric polymers suitable for use in adhesive compositions of the present invention are those derived from olefin monomers, for example butyl rubbers. Presently preferred for use are elastomeric polymers derived from monoolefinically unsaturated monomers in which the polymer has a saturated backbone. Particularly preferred are the elastomeric copolymers of ethylene and propylene although other elastomers may be employed. Useful ethylene-propylene copolymers ae those having from about 40–90% by weight combined ethylene, the balance propylene or propylene and a diene modifier, the latter to give the polymer a reactive group pendant to the polymer backbone. Propylene will comprise at least about 10% by weight of the polymer and the diene comprises 0–10% by weight of the polymer. If used the diene will preferably comprise 2–10% by weight of the polymer.

The diene modifiers are selected from non-conjugated dienes of which the following are a representative rather than exhaustive list: 1,4-hexadiene, 1,6-hexadiene, 1,4-pentadiene, bicyclopentadiene, and ethylidene norbornene.

Presently preferred polymers are those having a relatively low molecular weight and a relatively low ethylene content, the latter to cause the elastomer to have lower crystallinity, so as to minimize interfacial stress during adhesive bond formation.

The adhesive compositions may contain up to about 60 parts by weight of the elastomeric polymer in composition comprising 100 parts by weight of elastomer and normally adhesive polymer and usually comprises 15 to about 60 parts by weight. Blends exhibiting the best properties comprise from about 20–40 parts by weight of elastomeric polymer.

The adhesive blends may contain additional quantities of other ingredients normally incorporated into such compositions including tackifiers, fillers such as carbon black, antioxidants, other diluents and other stabilizers. The amounts of these can vary according to the properties desired and optimum amounts are easily determined by those skilled in the art.

The polymeric constituents and other additives to the adhesive compositions can be mixed in conventional compounding equipment. It is usually desirable to initially compound the elastomer and addends prior to incorporating the normally adhesive copolymer, particularly in the case of those having a high melt index.

The many advantages of the present invention will be apparent from a consideration of the following examples.

EXAMPLES 1-4

A series of binary blends (1-3) were made of an ethylene vinyl acetate copolymer having a 14 weight percent content of vinyl acetate and a melt index of 2500 decigrams per minute at 190° C. with three different olefin rubbers. Each blend was mixed using a high shear mixer. 910 grams of the rubber and 3.5 grams of Irganox 1010 stabilizer was placed in the high shear mixer and allowed to flux at a temperature of 70° C. until the rubber becomes tacky. 390 grams of the ethylene-vinyl acetate copolymer was then added in small increments (20-30 grams) to the rubber while the fluxing was continued until throughly mixed. After all the copolymer was added, the temperature of the resulting blend was raised to about 110° C. and held there for 20 minutes while fluxing was continued prior to discharging the blend into an individual container for each binary blend. A fourth test blend (Example 4) prepared as above with a commercial ethylene-vinyl acetate copolymer identified as Elvax 4320 is sold by E. I. DuPont, Wilmington. Del., and believed to have a vinyl acetate content of 25 weight percent and a melt index of 150 and an olefin rubber for comparison with the blends of the invention.

The results of the comparison is set forth in Table 1.

As seen from Table 1, the blend of the invention (Example 3) and the comparative blend (Example 4) both maintain outstanding low temperature flexibility (see brittleness data) along with good heat resistance (see S.A.F.T. data). What is unique about the blend of the invention (Example 3) which contains the high melt index ethylene vinyl acetate copolymer is that this broad temperature use range (as indicated by the brittleness and S.A.F.T. values) is maintained while greatly reducing the adhesive melt viscosity. This lower melt viscosity of adhesive blend 3 makes this blend easier to apply or makes it possible to apply at lower temperatures. This is advantageous particularly when applying the adhesive to heat sensitive materials, for example, polyolefin. These advantages are not possible when one must use the present blends as exemplified by that of Example 4 since that blend has an adhesive melt viscosity 635% greater than that discovered to be available from the blends of the invention (see the even lower values of the blends of Examples 1 and 2).

TABLE I

| | Blends of the Invention | | | Comparison Blend |
|---|---|---|---|---|
| | 1 | 2 | 3 | 4 |
| EX-042[1] | 70 | 80 | 70 | |
| ELVAX 4320[2] | | | | 70 |
| Butyl 065[3] | 30 | | | |
| Vistalon 404[4] | | 20 | | |
| Vistalon 457[4] | | | 30 | 30 |
| Irganox 1010[5] | 0.25 | 0.25 | 0.25 | 0.25 |
| Viscosity, cps ASTM D-3236 350° F. | 40,000 | 35,000 | 51,000 | 375,000 |
| Tensile Strength, psi ASTM D-638 | 172 | 246 | 139 | 206 |
| Elongation, % | 30 | 30 | 30 | 200 |
| Brittleness, °C. ASTM D746 | <−40 | −30 | <−40 | <−40 |
| Shear Adhesion Fact Temperature, °C. | 157 | 160 | 150 | 166 |

[1] Ethylene vinyl acetate copolymer available from Exxon Chemical Americas, Houston, Texas having a melt index of 2500 and a vinyl acetate content of 25% by weight.
[2] A terpolymer of ethylene vinyl acetate (25%) and acrylic acid (acid number 6) having a melt index of 150.
[3] A polyisobutylene polymer available from Exxon Chemical Americas, Houston, Texas having a Mooney Viscosity (ML1+8 at 100° C.) of 43.
[4] Ethylene-propylene copolymers available from Exxon Chemical Americas, Houston, Texas having Mooney Viscosities (ML1+8 at 100° C.) of about 40-43.
[5] Antioxidant available from Ciba-Geigy.

What is claimed is:

1. An adhesive composition comprising:
   (a) an ethylene-vinyl acetate copolymer having a vinyl acetate content of from 10 to 20% by weight and a melt index of from 1500 to 3,500; and,
   (b) an olefin elastomer which has a Mooney viscosity of 250° F. of less than about 70 and is present in amount of from 15 to 60 parts by weight per 100 parts by weight of the elastomer and the normally adhesive copolymer together.

2. An adhesive composition according to claim 1 wherein said copolymer has a vinyl acetate content of about 14% by weight and a melt index of 2500.

3. An adhesive composition according to claim 1 wherein said elastomer is present in an amount of from 20 to 40 parts by weight.

4. An adhesive composition according to claim 1 wherein said elastomer is selected from the group consisting of ethylene copolymers or terpolymers and butyl rubbers.

5. An adhesive composition according to claim 1 wherein the elastomer has Mooney viscosity of about 45 or less.

6. An adhesive composition according to claim 1 wherein the elastomer has Mooney viscosity of about 20 to about 25.

* * * * *